(12) United States Patent
Valentini et al.

(10) Patent No.: US 10,196,156 B2
(45) Date of Patent: Feb. 5, 2019

(54) POLYMERIC FOAM COMPOSITE FOR VEHICLE ARRESTING SYSTEM

(71) Applicant: Engineered Arresting Systems Corporation, Aston, PA (US)

(72) Inventors: Silvia C. Valentini, West Chester, PA (US); Hong Zou, Chadds Ford, PA (US); Michael T. Galbus, Middletown, DE (US); Nicholas M. Flynn, Aston, PA (US)

(73) Assignee: Engineered Arresting Systems Corporation, Aston, PA (US)

( * ) Notice: Subject to any disclaimer, the term of this patent is extended or adjusted under 35 U.S.C. 154(b) by 166 days.

(21) Appl. No.: 14/972,991

(22) Filed: Dec. 17, 2015

(65) Prior Publication Data

US 2016/0176544 A1 Jun. 23, 2016

Related U.S. Application Data

(60) Provisional application No. 62/165,401, filed on May 22, 2015, provisional application No. 62/093,622, filed on Dec. 18, 2014.

(51) Int. Cl.
*B64F 1/02* (2006.01)
*C08J 9/34* (2006.01)
(Continued)

(52) U.S. Cl.
CPC ................ *B64F 1/025* (2013.01); *C08J 9/34* (2013.01); *C08J 9/365* (2013.01); *E01C 9/007* (2013.01);
(Continued)

(58) Field of Classification Search
CPC .......... C08J 9/365; C08J 9/34; C08J 2325/06; E01C 9/007
See application file for complete search history.

(56) References Cited

U.S. PATENT DOCUMENTS 3,066,896 A 12/1962 Schirtzinger
4,781,271 A 11/1988 Wokeck
(Continued)

FOREIGN PATENT DOCUMENTS

GB 1282103 A 7/1972
GB 2399584 A 9/2004

OTHER PUBLICATIONS

International Patent Application No. PCT/US2015/066395, Search Report and Written Opinion dated Apr. 7, 2016.

*Primary Examiner* — Hai Vo
(74) *Attorney, Agent, or Firm* — Kilpatrick Townsend & Stockton LLP; Dean W. Russell; Kristin M. Crall

(57) ABSTRACT

Embodiments of the present invention relate to composite materials for use as a vehicle arresting system (also referred to as an Engineered Material Arresting System (EMAS). Specific embodiments may use modified polymeric foams composites. The polymeric foams may include additives, coatings, combinations of both, or other features than render them useful for an EMAS. The polymeric foams may also have one or more modified surfaces that provide a protective crust. For example, the one or more surface may be modified by application of heat in order to help close the polymeric foam cells and/or to create an encapsulative surface. These features can provide enhanced weather resistance, fire resistance, moisture absorption, jet blast resistance, improve their energy absorbing properties, or other desired features.

6 Claims, 3 Drawing Sheets

Section A-A

(51) Int. Cl.
*C08J 9/36* (2006.01)
*E01C 9/00* (2006.01)

(52) U.S. Cl.
CPC ........ *C08J 2205/08* (2013.01); *C08J 2325/06* (2013.01)

(56) References Cited

U.S. PATENT DOCUMENTS

| | | | |
|---|---|---|---|
| 5,193,764 | A | 3/1993 | Larratt et al. |
| 6,340,713 | B1 * | 1/2002 | Gluck ................ C04B 16/08 521/146 |
| 6,685,387 | B2 | 2/2004 | Allen et al. |
| 6,971,817 | B2 | 12/2005 | Allen et al. |
| 7,261,490 | B2 | 8/2007 | Allen et al. |
| 7,597,502 | B2 | 10/2009 | Allen et al. |
| 8,021,075 | B2 | 9/2011 | Valentini et al. |
| 2003/0049075 | A1 * | 3/2003 | Allen ................ B64F 1/025 404/6 |
| 2008/0247819 | A1 | 10/2008 | Valentini et al. |
| 2009/0255066 | A1 * | 10/2009 | Brock ................ A63C 19/10 14/69.5 |
| 2013/0020437 | A1 | 1/2013 | Valentini et al. |

\* cited by examiner

Section A-A

POLYMERIC FOAM COMPOSITE FOR VEHICLE ARRESTING SYSTEM

CROSS REFERENCE TO RELATED APPLICATIONS

This application claims the benefit of U.S. Provisional Application Ser. No. 62/093,622, filed Dec. 18, 2014, titled "Polymeric Foam Composite for Vehicle Arresting System," and U.S. Provisional Application Ser. No. 62/165,401, filed May 22, 2015, titled "Polymeric Foam Composite for Vehicle Arresting System," the entire contents of each of which are hereby incorporated by reference.

FIELD OF THE DISCLOSURE

Embodiments of the present disclosure relate generally to composite materials for use as a vehicle arresting system (also referred to as an Engineered Material Arresting System (EMAS)). Specific embodiments may use modified polymeric foams composites. The polymeric foams may include additives, coatings, combinations of both, or other features than render them useful for an EMAS. The polymeric foams may also have one or more modified surfaces that provide a protective crust. For example, the one or more surface may be modified by application of heat in order to help close the polymeric foam cells and/or to create an encapsulative surface. These features can provide enhanced weather resistance, fire resistance, moisture absorption, jet blast resistance, improve their energy absorbing properties, or other desired features.

BACKGROUND

Aircraft can and do overrun the ends of runways, raising the possibility of injury to passengers and destruction of or severe damage to the aircraft. Such overruns have occurred during aborted take-offs or while landing, with the aircraft traveling at speeds up to 80 knots. In order to minimize the hazards of overruns, the Federal Aviation Administration (FAA) generally requires a safety area of one thousand feet in length beyond the end of the runway. Although this safety area is now an FAA standard, many runways across the country were constructed prior to adoption of this standard. These runways may be situated such that water, roadways, or other obstacles prevent economical compliance with the one thousand foot overrun requirement.

In order to alleviate the severe consequences of overrun situations, several materials, including existing soil surfaces beyond the runway, have been assessed for their ability to decelerate aircraft. However, soil surfaces are not the best solution for arresting moving vehicles (i.e. aircraft), primarily because their properties are unpredictable.

Another system that has been explored is providing a vehicle arresting system or other compressible system that includes material or a barrier placed at the end of a runway that will predictably and reliably crush (or otherwise deform) under the pressure of aircraft wheels traveling off the end of the runway. The resistance provided by the compressible, low-strength material decelerates the aircraft and brings it to a stop within the confines of the overrun area. Specific examples of vehicle arresting systems are called Engineered Materials Arresting Systems (EMAS), and are now part of the U.S. airport design standards described in FAA Advisory Circular 150/5220-22B "Engineered Materials Arresting Systems (EMAS) for Aircraft Overruns" dated September 2012. EMAS and Runway Safety Area planning is guided by FAA Orders 5200.8 and 5200.9.

A compressible (or deformable) vehicle arresting system may also be placed on or in a roadway or pedestrian walkway (or elsewhere), for example, for purposes of decelerating vehicles or objects other than aircraft. The systems may be used to safely stop cars, trains, trucks, motorcycles, tractors, mopeds, bicycles, boats, or any other vehicles that may gain speed and careen out of control, and thus need to be safely stopped.

Some specific materials that have been considered for arresting vehicles (particularly in relation to arresting aircraft), include cellular concrete, foamed glass, ultra lightweight cementitious materials, perlite and cement, and chemically bonded phosphate ceramic (CBPC). These materials can be formed as a shallow bed in an arrestor zone at the end of the runway. When a vehicle enters the arrestor zone, its wheels may apply pressure to the material, causing the material to crush or collapse and create an increase in drag load.

However, some of the materials that have been explored to date can be improved upon. For example, some types of foams can be disadvantageous in that they may have an immediate "rebound" characteristic, resulting in return of some energy following compression. For example, they may snap back to shape, much like a rubber band. This is undesirable because once the arresting function is complete, extraneous energy should not then be re-asserted against the aircraft tire. (However, as described below, some of the materials according to this disclosure may have a slow rebound characteristic, such that any rebound that may occur takes place after the vehicle has passed the system.) Cellular concrete has density and compressive strength properties that may vary with time and that some properties could be difficult to maintain in production due to the innate properties of its variable raw materials and subsequent hydration process. A ceramic property is set to a stable state during firing process, but foamed glass properties can be difficult to control (including uniformity, particle size, grain strength, etc). It is thus desirable to develop improved materials for vehicle arresting beds.

One further example has explored an aircraft arresting system using phenolic foam panels. This is outlined in U.S. Pat. No. 5,193,764. This solution seeks to provide rigid foam boards that can be stacked in layers and secured to one another via adhesive. The rigid foam is a closed cell structure, having a density in the range of 2-4 pounds per cubic foot and a compressive strength in the range of 20-80 pounds per square inch. The preferred material described in this patent is phenolic foam, and the adhesive is a latex adhesive. Phenolic foam on its own has high water absorption, so this system was not explored or pursued further by the FAA.

ACRP Report 29—"Developing Improved Civil Aircraft Arresting Systems" is a 2009 report created by the Transportation Research Board (and sponsored by the Federal Aviation Administration). This report explores various materials that may be used as energy absorbing for EMAS. The report mentions polymer cellular foams, such as phenolic foam and styrofoam, but states that "it was determined that a cementitious foam provided advantages over polymer foams" (see Section 2.2), leading one of ordinary skill in the art away from pursuing polymer foams.

BRIEF SUMMARY

Embodiments of the present invention relate to composite materials for use as a vehicle arresting system (also referred to as an Engineered Material Arresting System (EMAS). Specific embodiments may use modified polymeric foams composites. The polymeric foams may include additives, coatings, combinations of both, or other features than render them useful for an EMAS. The polymeric foams may also have one or more modified surfaces that provide a protective crust. For example, the one or more surface may be modified by application of heat in order to help close the polymeric foam cells and/or to create an encapsulative surface. These features can provide enhanced weather resistance, fire resistance, moisture absorption, jet blast resistance, improve their energy absorbing properties, or other desired features.

In one example, there is provided a polymeric foam material configured for use in a vehicle arresting system, comprising: one or more cores formed of a polymeric foam material; and a coating, encapsulation, or layer of protective material formed around the one or more cores. The polymeric foam material may be polystyrene, polyurethane, polyester, or polypropylene, and does not include a phenolic foam. The polymeric foam may be extruded polystyrene or and expanded polystyrene.

The polymeric foam material may include one or more additives. The polymeric foam may have a protective crust formed on one or more surfaces of the material. The crust may be formed on the one or more surfaces of the material via heat modification, powder coating, spraying, or any other surface modification method. There may be a coating comprising a flame retardant, weather resistant coating. In one example, the polymeric foam material exhibits a stress vs. strain profile that remains relatively constant over an extended strain range.

In another example, there is provided a vehicle arresting system, comprising: a plurality of cores formed from a polymeric foam, the plurality of cores comprising a coating or containment system applied to one or more individual cores or applied to the plurality of cores, wherein the plurality of cores are installed at the end of an aircraft runway. The cores may be positioned with respect to a jet blast resistant containment system.

DETAILED DESCRIPTION

The present inventors have determined that polymeric foams may function as an energy absorbing material for a vehicle arresting system. The polymeric foams may function beneficially if their composition is changed, or if they are treated, coated, or otherwise modified in ways that render them suitable for the vehicle arresting purpose.

In one example, the energy absorbing may be provided by encapsulated cellular polymeric composites. The encapsulation may provide a containment system. The encapsulation may be provided by any appropriate coating, laminate, membrane, containment, protective material, over layer, or any other substance that can at least partially encapsulate, cover, or otherwise protect the polymer foam core from premature degradation or insult. The encapsulation may be provided by a sprayed or dipped coating. The encapsulation may be provided by application of heat to one or more polymeric foam surfaces. This may create a hardened crust. This may create an encapsulative surface that can, for example, allow a worker to walk on the resulting polymeric foam composite or that can help protect the material from jet blast. The encapsulation may provide resistance against fire damage, small objects that are dropped onto the surface, degradation, weather (rain, water vapor, UV exposure, hail, snow, freezing and so forth), animal attack, chemical spills, and/or forces associates with wind or jet blasts. In addition, the encapsulation may provide a non-skid surface to improve traction for pedestrians or additional surface area in which paint can adhere. Various non-limiting encapsulations and/or coatings are outlined below. The encapsulated polymeric composites may be cellular in nature.

The present inventors have also investigated modified polymeric foams with additives and other components that improve the properties further, which may make polymer foams more promising and more usable in the desired environments. These polymer foams with additives may be encapsulated as outlined herein. However, these polymer foams with additives may be used alone, without such encapsulation or coating. The polymeric foam composites explored may have a low rebound, which can allow them to be useful in safely arresting a vehicle.

Figure 1:
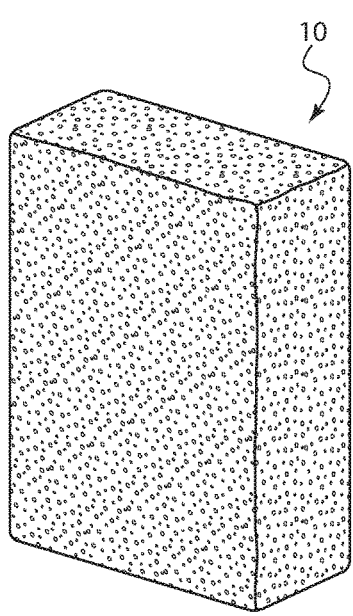
FIG. 1 shows one example of a foam block that may be used in accordance with various embodiments of this disclosure.
Figure 2:
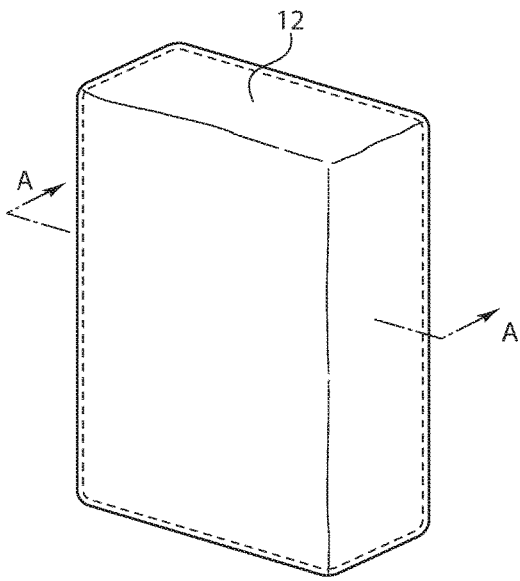
FIG. 2 shows the foam block of FIG. 1 with a coating applied thereto.
Figure 2A:
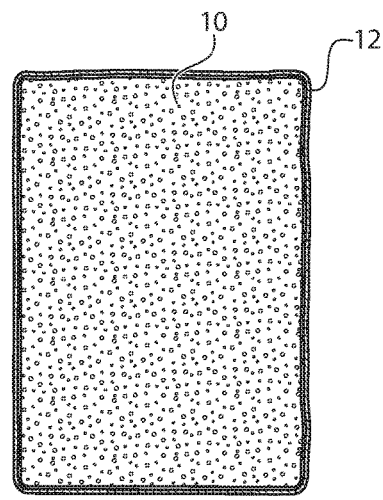
FIG. 2A shows a cross-sectional view of the foam block of FIG. 1 along the line A-A.

Embodiments of the present disclosure thus provide a vehicle arresting system that may include a low-rebound polymeric foam core 10. The polymeric foam core may be modified to contain a variety of additives. The cores 10 may be in the form of sheets with varying thicknesses, monolithic structures, or different shaped or oriented components. FIG. 1 provides just one example of an exemplary polymeric foam core 10. Although a certain shape is shown, it should be understood that the cores may be formed in any appropriate shape or configuration. The cores 10 may be in the form of blocks, hollow, or perforated structures, or other shaped items. The cores may be stacked, fabricated, or otherwise formed or oriented into the desired arresting bed shape. The cores may be adhered to a runway surface. As illustrated by FIG. 2, the cores may have one or more coatings or outer layers 12 (also referred to as a "containment system") applied thereto. The cores may be positioned within an external containment system that maintains the cores in relation to one another.

In general, the composite system may compress under load and may have minimal rebound. It should be understood, that some rebound can be acceptable. If a material having some rebound is used, it is generally intended that the rebound be slow enough that it does not apply rebound pressure against a vehicle tire moving over the material. Any rebound that may take place occurs after the moving vehicle tire has passed. These features may lend to the use of a modified polymeric foam material in an EMAS. The system may have a failure mode that creates smaller pieces which may reduce risk of foreign object debris (FOD).

In one example, when such a vehicle arresting system is contacted by a load bearing structure (e.g., wheels, tracks, landing gear) of the vehicle to be stopped, the material will generally collapse and compress with a force less than or equal to that of the resultant forces embodied by the vehicle/mechanism. This may offer low rebound resistance, improving further the energy absorbed in the overall interaction between system and vehicle. In another example, when a vehicle arresting system is contacted by a load bearing structure of the vehicle to be stopped, the material may break and crush. It is also generally desirable for the material to also have outer surfaces that can withstand jet blasts, the weight of workers walking on the material, and other external forces without immediately crushing. Accordingly, it is also possible to provide one or more surface treatments that can assist with forming an outer crust or a differentiated layer on the material. It is not required for the crust to be a particularly thin crust. The top layer could be a crust that sizes anywhere from 1/64 inch up to half the thickness of block itself.

This differentiated layer may effectively be a secondary or additional layer. The crust layer could provide a composite block-like material. In one example, it is possible to combine two different foam materials, with one of the materials providing a different characteristic than the first material. In another example, a polymeric powder could be added to the surface of block and heated to form the crust. In another example, a layer may be laminated to the block. In another example, a layer may be sprayed, painted, or dipped onto the block.

The following provides a description of properties of some polymeric materials that may be used to form a polymeric foam core. This description also includes various additives, modifications, and containment/coating systems that may be used.

Raw Material:

The raw material may be polymeric foam material. The raw material source may be an organic polymer (polystyrene, polyurethane, polyester, polypropylene, phenolic compounds, and so forth or blends of any mentioned above). Non-limiting examples of exemplary materials include an extruded polystyrene foam, an expanded polystyrene foam, an extruded polyurethane foam, an expanded polyurethane foam, an extruded phenolic foam, an expanded phenolic foam, or any combination thereof. The material may be a complex polymeric blend. The blend may include one or more fillers, copolymers, blowing agents, cross-linking polymers, density modifiers, accelerators, retardants, lubricants, combinations thereof, or any other added components. The material may be any polymeric foam that is modified and/or coated and/or encapsulated in one or more of the ways described herein.

One example of a foamed polymer is polyurethane that is used for floral and craft applications. This material absorbs energy, but it also may absorb water and burn easy under fire conditions. This material also rebounds after initial pressure is applied, which is not desirable for use with a vehicle arresting system. Another example material is extruded polystyrene, which is used for craft applications. This material absorbs energy, but it is not flame retardant and may have a higher than desired rebound. Accordingly, although such materials may be used in the present disclosure, it is believed that one or more modifications should be made to such foamed polymers for their use in an EMAS. These modifications may be the addition of one or more fillers to the foam itself; and/or providing a coating, laminate, or other coating over the material.

In one specific, non-limiting example, an extruded polystyrene foam (XPS) (one example of which is called Impaxx® Foam, sold by The Dow Chemical Company) may be used. This material is sold as an energy absorbing material, and it is currently applied in some racing car bumpers, doors, and other high end applications such as helicopter door and floor panels. This material, however, may be modified for its successful use as an EMAS (engineered material arresting system) core. Without one or more modifications, it is believe that this material may be anisotropic, too strong, and may create a fire hazard. The present inventors have determined that modifying such foam materials can overcome these challenges. An XPS foam generally does not rebound, but breaks or snaps upon crushing.

Figure 3:
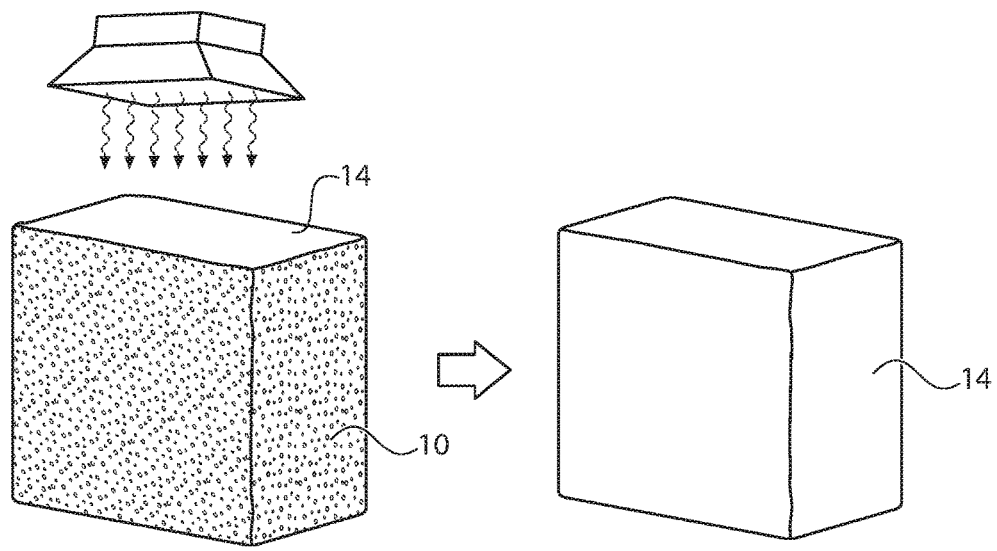
FIG. 3 shows a foam block having a crust created by application of heat to one or more surfaces.

In some instances, the extrusion process used to create extruded polystyrene foam can create a top edge or crust 14 on the foam. This is illustrated by FIG. 3. This crust material may be cut off when the foam is used for other purposes, but for the present disclosure, it is possible that the crust 14 created may be left in place on the court 10 in order to help add to the strength of the material and form a protective coating/crust/covering/encapsulation.

In another example, and expanded polystyrene (EPS) foam may be used. EPS foam may have some rebound/more elastic deformation, but the rebound is generally slow so that it does not immediately react against vehicle tire.

Other potential foam panel manufacturers include but are not limited to Owens Corning, Georgia Pacific, Pactiv, Certainteed (a division of Saint Gobain), JM Corp, BASF, and others. Many of these companies make polymeric foams in panel form (mostly used in housing as insulation materials). But none of these materials are deemed fully suitable to function as a true vehicle arresting system. They will not withstand the harsh environment of placing such foams at the end of a runway, and exposed to weather elements for a prolonged time, as required of an EMAS—per FAA circular, which requires 20 years of durability.

Current laminated foams available in the market are made, using fabrics, metal laminates or plastic films or carriers. The intended action of such "laminated foams" is to protect the foam core itself from moisture absorption (such as PU foams sold for housing industry). Such laminates are not suitable for an EMAS application, since they are either too strong or too elastic, do not tear easily, or deform under pressure. This characteristic alone, makes current over-the-counter laminated foam products not suitable for EMAS. Lamination may interfere with performance and may not last when exposed to outdoor environment. Current foam panels are not sold to be exposed, but to be covered with other materials when building a house or a floating device, etc.

The present inventors have determined that the polymeric foam may be modified in one or more ways to allow to it have the desired crushing and/or compressive strength features. (Many of these features, limits, and parameters are defined in Applicants' co-pending applications and issued patents. The desired compression may be referred to as compressive gradient strength (CGS) in some of these materials.) These modifications may be the addition of one or more fillers and/or providing a coating, laminate, encapsulation, containment system, or other coating or layer over the material.

Material Parameters.

Figure 5:
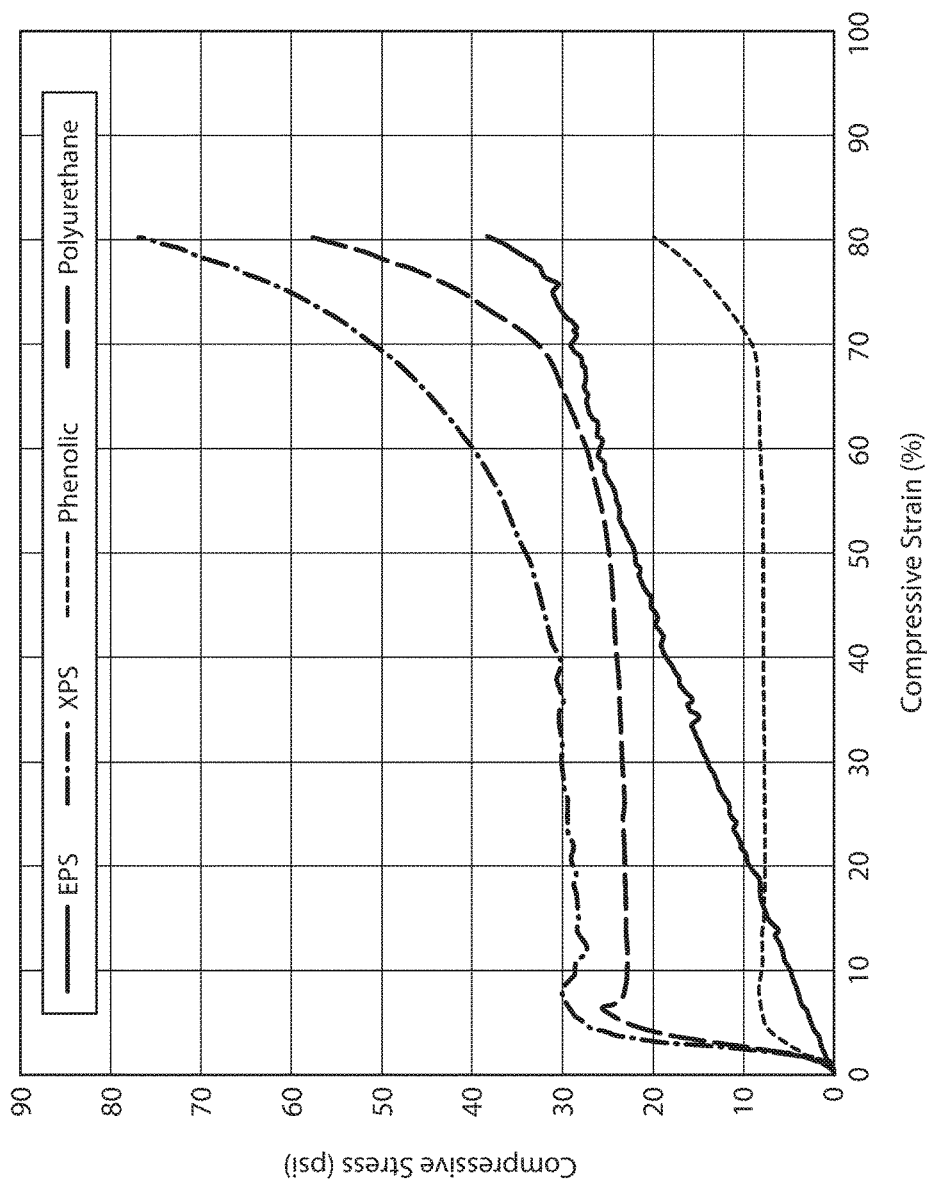
FIG. 5 provides a graph illustrating various compressive strengths vs. compressive strains for four materials tested for use in connection with this disclosure.

In order to determine the appropriate polymeric foam material for a particular use, testing may use an energy absorption curve. One example is illustrated by FIG. 5. This testing may compare a compressive strength (measured in pounds per square inch "psi") with respect to a compressive strain (measured in percentages %). As illustrated, there is a an initial strength parameter, which may plateau, until a certain compressive strain is reached. When stress remains relatively constant over an extended strain range, creating a plateau-like profile, this may reflect that the material tested could have beneficial effects when used in an EMAS. It is possible for related testing to be done in order to analyze an energy curve profile of any particular polymeric foam material. However, not all foams create a plateau but they may still be a promising candidate. If a particular material looks promising, it is possible to add one or more coatings to the material. Additionally or alternatively, it is possible to add one or more additives in order to change or otherwise modify certain material parameters to alter foam strength or any other factors.

Additives:

Additives are not required, but if they are provided, they may include a fire retardant or other fillers. Other additives may include but are not limited to pigments, graphite, carbon fibers, aerogel particles, nano materials, cementicious materials, ceramic materials, or combinations thereof. Gasses or chemicals could be added that act as components or processing aid to create the foam. Other optional additives may include but are not limited to animal or plant growth repellants. For example, an additive may be added to the material that causes the material to have a scent or a taste that is displeasing to animals. For example, an additive may be added to the material that prevents bacterial or mold growth on the material. Other additives are possible and considered within the scope of this disclosure. In one example, the materials to be added may be generally intended to cause the foam to reliably crush, deform, or collapse upon contact with a vehicle moving at a certain speed in order to arrest the vehicle's movement and/or to modify its mechanical properties and isotropy nature. Optional additives may also help protect the integrity of the material from animal, microbial, or weather attack.

In one example, it is possible to include one or more additives that increase the brittleness of the material. For example, the desired mode of failure of the EMAS is a "snapping failure" versus an elastic (e.g., pulling a piece of rubber) failure. (This is common behavior in many commercially available foams today.)

Processes:

Any process (current or future) that is used to manufacture foam may be used to manufacture the polymeric foam composites described herein. The main processes that may be used for manufacture of the core components described herein are believed to be:

Extrusion of the hot polymers with gases (i.e. XPS)

Expansion of hot polymers with gases (i.e. EPS)

Expansion of polymers by chemical reaction (i.e. expanded polyurethane)

Any the above processes can make the foam alone, or the coated/laminated foam.

It should be understood that other processes are possible for use for different types of foam and are considered within the scope of this disclosure.

Heat Modification:

In one example, it may be possible to apply heat to one or more surfaces of a polymeric foam core or component. This modification may be done after the core has been formed (post processing) or during formation of the core (e.g., during extrusion). Heat modification may be accomplished during the extrusion process. In one embodiment, the crust material 14 may be formed as the material is extruded through a very hot die. Heat modification may be accomplished using a heat plate that may be applied to the surface. Heat modification may be accomplished via an oven or other heat producing appliance. Heat modification may be accomplished by use of a flame application, blow torch, or by applying or contacting any other type of heated instrument to the surface of the core in order to apply heat to one or more of the surfaces. Heat modification may be accomplished via the extrusion process itself. The general goal is to change the character of the polymeric foam material on at least one surface in order to provide an encapsulation crust 14 on at least the surface that is exposed to the heat modification.

The temperature used may be sufficient to cause about 1/64" to about 1" of the outer layer to melt and to form a crust on the core. One useful analogy may be the creation of crème brûlée. In use, a hardened, generally non-porous crust is formed on top of a more porous polymeric foam material via application of heat.

The crust that is formed can provide a hard surface on the core. It may have the appearance of a gel-like coat. The hard surface can help to prevent water penetration, animal attack, jet blast damage, and/or can provide a surface on which a worker may walk during inspections of the arresting system.

Other Modifications.

In one example, polymer foam may be perforated with holes/slits/cuts that can weaken the material in a specific direction or mode. This can result in a material that disintegrates easily by hand into small, light pieces, without sharp edges. The material proposed will generally not stick to metal surfaces which means it will not present a foreign object debris (FOD) risk; or be a potential source of damage to the aircraft. In addition, these perforations can modify the mechanical properties of the material, which can make the material a better energy absorber. In a specific example, the polymer foam material may be an extruded polystyrene. The holes may be formed by any appropriate method, including formed after manufacture of the foam or formed during manufacture of the foam.

Containment System/Coating/Encapsulation.

It is also possible to provide a containment system around a core block of material, a segment of core blocks of materials, or around an entire formation of core blocks of material in order to provide a barrier. This can be a barrier to weather elements, external elements (human or animal tampering), a flame retardant barrier, or any combination thereof, as outlined above. This may be formed as a layer 12, a membrane, a coating, a cover, or any other system that functions to at least partially protect the polymeric foam core or combination of cores from possible degradation from various sources.

One potential containment system may be provided as a flame retardant coating 12 that may be used for a thermal and flame barrier. One non-limiting example of such a material is sold today as Temprotex™. A flame retardant material may be applied like a paint to coat the polymeric core material. It may be sprayed, brushed, dipped, glued or applied via any other appropriate method onto one or more cores of material. Another potential coating is a polyurea coating.

Figure 4:
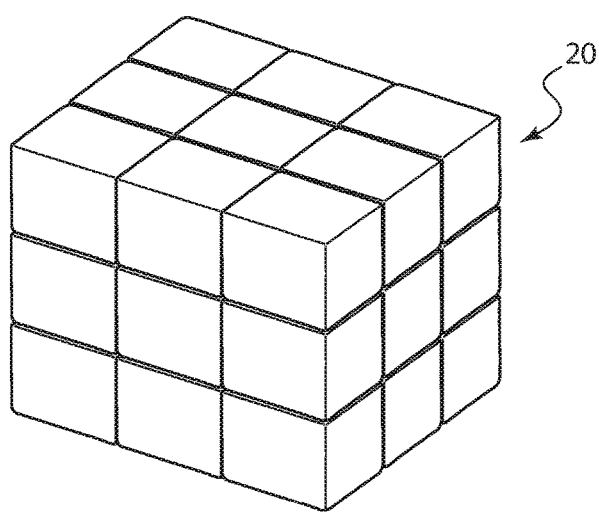
FIG. 4 shows a collection of polymeric foam blocks that may be used to create a vehicle arresting system.

Another potential containment system may be providing a top coat comprising a fabric, panel, coating, crust, or other cover/coat/material. For example, the above-described heat-formed crust may assist with preventing flaking or other damage to the material. In a specific embodiment, this top coat containment system need not cover the individual core components 10, but may be formed over the entire system 20. (One example of a system 20 of core components 10 in relation to one another is illustrated by FIG. 4.) In other examples, this top coat may cover individual segments of multiple blocks or components of material, or it may cover individual blocks or components of material.

Although the containment system generally provides strength to the core 10, it is also possible to provide one or more additives to the coating that cause the coating to be frangible. This can allow a vehicle wheel to penetrate the coating/core upon impact. This can help reduce risk of foreign object damage (FOD) due to portions of the coating breaking and being propelled through the air. In another example, the coating may be a flexible/deformable coating. Upon impact of a vehicle wheel, the coating may cause deformation of the foam, but not crushing. It is possible for different failure modes to be provided by different containment systems.

Another potential containment system is to provide core blocks or components of material that are packaged in small groups that make up the overall system. These concepts may be described in Applicants co-pending application 2013/0020437.

Another potential containment system is to provide each individual core component as individually packaged or coated. An EMAS may be formed by using a plurality of individual coated components.

Securement. Various methods may be used to secure the cores 10 in the desired location, which is typically an aircraft runway. In one example, a layer of asphalt may be used to adhere a series of foam cores 10 to a runway. Because the foam cores 10 have a low shear strength and would likely be ripped from place due to jet blast, the cores 10 are generally coated to add strength and to help secure the foam in place. In one example, the coating may be a polyurea coating. Such a coating is fairly strong and elastic but can help protect the core from weathering, jet blast, and other environmental assault. Other coatings are possible. For example, one or more of the other coatings described herein may be used.

In one example, each individual block may be coated individually prior to securement. In another example, a whole system of blocks may be secured and then coated collectively. There may be provided one or more layers of adhesive between foam billets.

In another example, the cores may be secured with respect to a jet blast resistant (JBR) containment system. The present assignee holds various patents on certain systems, any of which may be used in connection with this disclosure. Examples include U.S. Pat. Nos. 6,685,387; 6,971,817; 7,261,490; 7,597,502; 8,021,075.

Transportation of Core Material:

Because polymeric foams have been found to be lighter than some of the other types of vehicle arresting materials that have been used to date, it is possible to form the core material such that it is easier to transport. In one example, the core may be formed with a gripping indentation on one or more sides of the core. This can assist a worker with lifting the core material and positioning it as desired as the vehicle arresting system is to be formed. In another example, the core may be formed with one or more handle elements that protrude from the core. The handle elements may be formed as core material itself (for example, a handle component may be formed during processing and then subjected to heat modification to harden the handle during post processing). The handle elements may be added as additional elements, such as rope handles formed integrally with the core, a metal handle, or so forth. It is also possible to provide an indentation, hole, or other form of opening feature in the cores that may receive a tong or other element that can be inserted into the indentation, hole or opening for easing transportation of the core material.

Changes and modifications, additions and deletions may be made to the structures and methods recited above and shown in the drawings without departing from the scope or spirit of the disclosure or the following claims.

What is claimed is:

1. A vehicle arresting system, comprising:
    an aircraft runway;
    a plurality of cores, each core comprising a polymeric foam block, and a weather resistant coating or encapsulation in direct contact with and completely covering the polymeric foam block,
    wherein the polymeric foam block comprises polystyrene, extruded polystyrene, expanded polystyrene, polyurethane, polyester, or polypropylene, and wherein the polymeric foam block does not include a phenolic foam,
    wherein the plurality of cores are installed at the end of the aircraft runway; and
    wherein the plurality of cores comprise a compressive strength in the range of 20-80 pounds per square inch such that they crush or deform under the weight of an overrun aircraft in order to stop the overrun aircraft.

2. The system of claim 1, further comprising one or more additives in the polymeric foam block.

3. The system of claim 1, further comprising one or more handles on the polymeric foam block.

4. The system of claim 1, wherein the polymeric foam block exhibits as tress vs. strain profile that remains relatively constant over an extended strain range.

5. The system of claim 1, wherein the plurality of cores are positioned with respect to a jet blast resistant containment system.

6. The system of claim 1, wherein the weather resistant coating or encapsulation further comprises a flame retardant.

* * * * *